United States Patent [19]

Yeh

[11] 4,237,624
[45] Dec. 9, 1980

[54] CARDS FOR LEARNING PRONUNCIATIONS

[76] Inventor: Richard S. Yeh, 1470 Bellwood Rd., San Marino, Calif. 91108

[21] Appl. No.: 944,378

[22] Filed: Sep. 21, 1978

Related U.S. Application Data

[63] Continuation-in-part of Ser. No. 771,031, Feb. 22, 1977, abandoned.

[51] Int. Cl.³ .................... G09B 19/04; G11B 25/04
[52] U.S. Cl. .................... 434/169; 360/2; 434/311
[58] Field of Search ................. 35/35 C; 360/2

[56] References Cited

U.S. PATENT DOCUMENTS

| | | | |
|---|---|---|---|
| 2,677,200 | 5/1954 | MacChesney | 35/35 C |
| 3,348,320 | 10/1967 | Brokaw | 35/35 C |
| 3,737,884 | 6/1973 | Wallace | 360/2 |
| 3,760,164 | 9/1973 | Kral | 35/35 C X |
| 3,801,804 | 4/1974 | Glahn | 360/2 X |
| 3,997,917 | 12/1976 | Kihara | 360/2 X |

*Primary Examiner*—Harland S. Skogquist

[57] ABSTRACT

The standard pronunciation of a word in any language is recorded on a segment of wide magnetic tape which is mounted on a flexible card or sheet. For visual reading of the same word, spelling or character is printed on the same card. A device is provided to transport and guide each card so as to have sound recording portions of the card make a sliding contact with the electromagnetic transducer head.

9 Claims, 3 Drawing Figures

CARDS FOR LEARNING PRONUNCIATIONS

This invention relates in general to sound reproducing devices operatable with a special kind of cards and especially useful in learning pronunciations. This application is a continuation-in-part of my copending application Ser. No. 771,031, filed Feb. 22, 1977 now abandoned.

Although several apparatus related to teaching machine for use in language laboratories are known, all of the known systems including the related device and the like are usually bulky and complex, or, if not bulky, at least expensive for individual use. The complexity of machine configuration is partly due to the functions imposed on machines but serving the teaching purposes; however, one of the modes of language learning can be multiple practices at individual discretion. Accordingly the invention comprising the device is made primarily for home use and availability in consumer market by reducing size and weight.

In accordance with the present invention, there is described a sound reproducing device in which a flexible card employed as sound recording medium is locally bent over the surface of frictional drive roller and then oppositely bent over the electromagnetic transducer head during the processes of sound reproduction; the diameter range of the drive roller is kept small in order to effectively obtain an appropriate tape speed from the motor speed. Unlike with a continuous system of recording medium, the spelling of a word is directly printed on each card and the correct pronunciation of each word is recorded (magnetically) on the same card, so that the words written on the cards can be visually read while listening to the standard pronunciation of the words by merely feeding the cards one at a time into the sound reproducing device with a card feeder of the sound reproducing device.

Although device system based on compactness have been suggested, for example, in U.S. Pat. No. 3,997,917 to Kihara it includes a complex speed reduction gear, for example, the drive roller of a large diameter and similar complicating components making the device system bulky, if not dense, and without really eliminating undue mechanical wear of the head by having the drive roller engaging the head. Therefore it is to provide a simple device which avoids the problem of the prior art mentioned above. It has, however, been discovered quite satisfactorily in accordance with the present invention that excellent reproduction of pronunciation results if the properties of the flexible cards are utilized with the special device configuration described hereafter. In all of the prior art no advantage of utilizing such card properties is ever taken into account in attempting to bring the device system into a simple and compact configuration. Moreover, the advantages according to the present invention are: (a) No extra speed reduction gear is needed as the drive roller 15 has a small diameter. (b) Frictional engagement is enhanced by having a flexible card locally bent over the drive roller 15. (c) A stack of flexible cards, say one hundred sheets, is not bulky since the flexible cards in general are not very thick cards though it is not necessarily thin.

In the preferred embodiment, mechanical parts are therefore kept to a minimum in view of operational characteristics of several kinds of magnetic tape sheet and physical properties of the flexible card-sheets so as to form an integrated device in the realm of magnetic and electronic components available in the consumer market; a segment of wide magnetic tape sliced wider or much wider than standard width is called magnetic tape sheet.

Accordingly it is an objective of the present invention to provide a system of sound recording medium for learning the pronunciation of each word from flexible cards. Another objective of the invention is to provide a simple and compact sound reproducing device to match the dimensions and physical properties of the flexible card.

Figure 1:
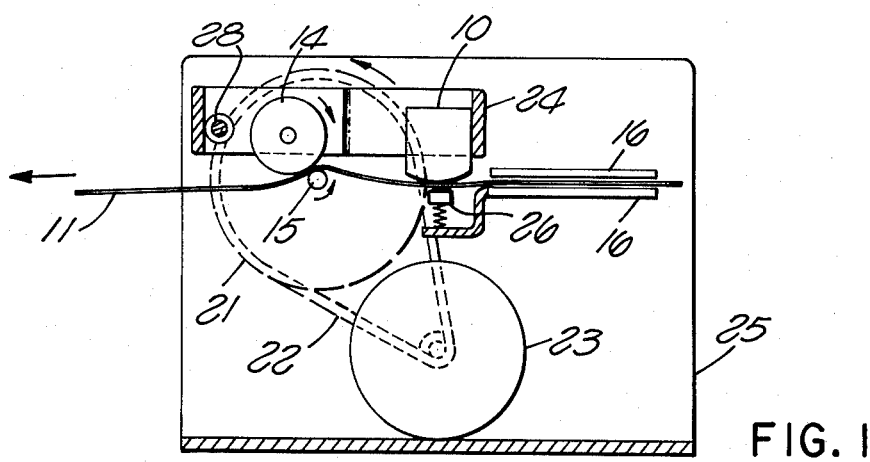
FIG. 1 is a longitudinal sectional view of an arrangement for the sound reproducing device with a card feeder while a card is transported by the feeder.
Figure 1A:
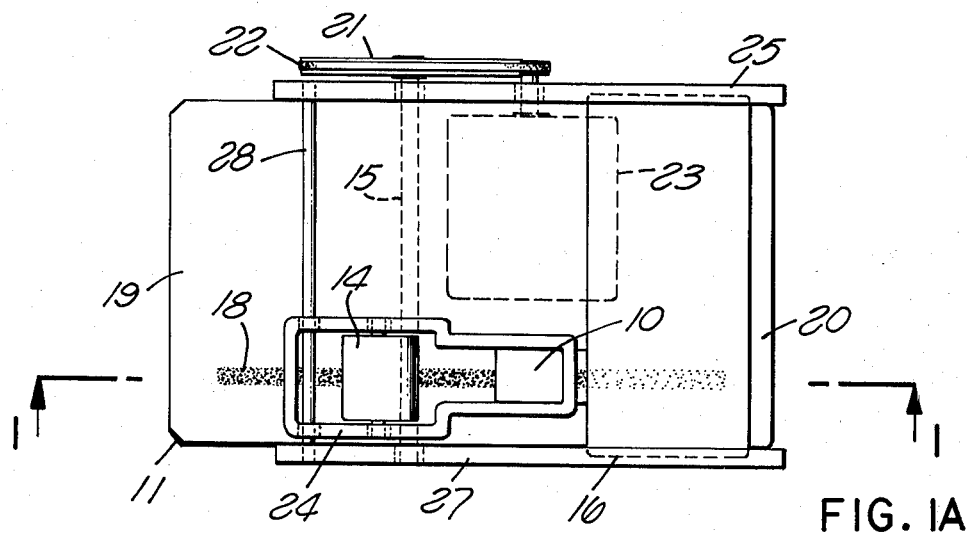
FIG. 1A is a top view of the same arrangement for the sound reproducing device as that of FIG. 1.
Figure 2:
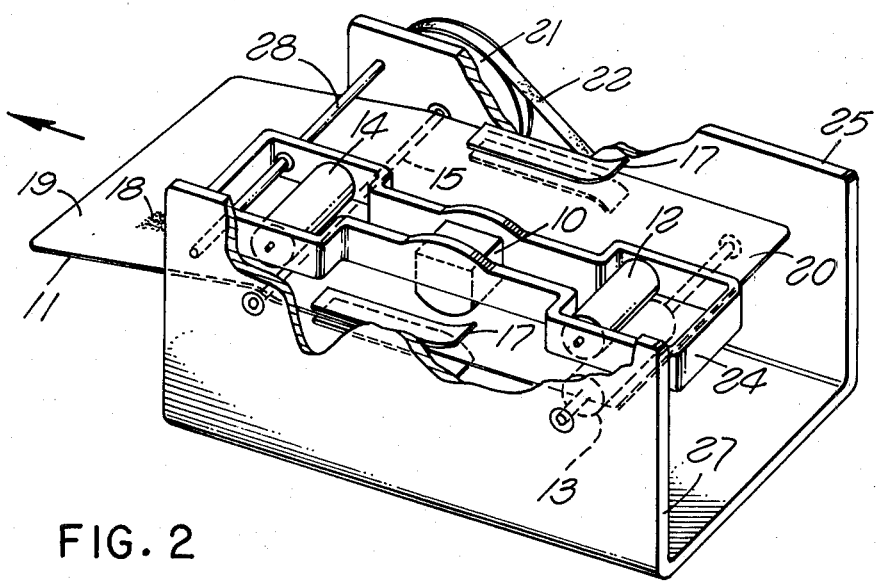
FIG. 2 is a perspective of another arrangement for the sound reproducing device with a card-feeder, also showing a card being transported.

Though the device is pictured so that the cards appear horizontally in FIG. 1, 1A and FIG. 2, the directional preference is not mentioned in any part of the disclosure or the claims as it is immaterial. The stringent requirements are imposed on the card itself in use around which the device components are assembled as illustrated in the figures. Therefore some details of construction are rather not to be considered as limitations upon the invention or upon the claims. The sizes and shapes of elements of drawing should not be considered as exactly proportional to actual sizes and proportionality.

The function of the card feeder is to transport a card and to bring a sound recorded portion of a card in proper contact with the electromagnetic transducer head 10. The sound recorded portion 18 of a card 11 is long in the direction parallel to the movement of transported card 11 and is much narrower in comparison with the width of a card 11 as shown in FIG. 2. The direction is called longitudinal direction and the direction perpendicular to it is called lateral direction. A drive roller 15 of the card feeder causes a flexible card 11 to be transported longitudinally, and the lateral direction is in the direction of the axis of the drive roller. When the drive roller is mounted on a planar board 25 perpendicularly, the lateral direction can be represented by a normal vector of the board.

Usually longitudinal sides of a card are longer than the lateral sides. The minimum length of longitudinal sides of a card depends on the velocity of a transported card and the average time for pronouncing a word; the velocity is determined by the operational characteristics of magnetically susceptible material coated on the magnetic tape sheet; the length can be made equal to the product of those two factors plus the width of margins 19 and 20 (FIG. 2) left at the leading lateral side and at the tail (i.e. the other lateral side) of a card. As an example, several cards of the size, 6 cm by 15 cm, are prepared; the longitudinal length of 15 cm is enough to record pronunciation of a word on 3 inch open reels of tape. With a higher density magnetic tape sheet, the minimum length of said flexible card is shorter. For example, the flexible cards of the size, 5.5 cm by 9 cm, are used to record a word on a cassette magnetic tape sheet.

The card feeder in general comprises a pair of drive rollers, power transmitting means and guide means. Said pair of drive rollers is also a pair of clamping rollers, which is meant to be a pair of parallel rollers placed closely side by side so that a card may go through (a gap) between them as rollers turn. The pair of rollers 12 and 13 located at the entrance for a card is called the pair of guide rollers, and the pair of rollers 14 and 15 located at the exit for a card is called the pair of drive rollers. A d.c. motor is connected to one of two rollers of the pair of drive rollers. The gap distance between two rollers belonging to a pair is made changeable either to clamping position (no gap) or to open position for insertion of a card. A shiftable lever 24 is used to construct the adjustable mechanism.

The roller of the guide pair mounted on the shiftable lever 24 is called the auxiliary roller 12; the other roller of the guide pair mounted on the planar board 25 is called the guide roller 13. The roller of the drive pair mounted rotatably on the lever 24 is wrapped all around by a smooth rubber material and called the rubber roller 14; the other roller of the drive pair rotatably mounted on the board 25 is connected to the d.c. motor and called the drive roller 15.

While said flexible card is transported by the card feeder, the flexible card is slightly but sufficiently bent over the surface of said head 10 so that a sound recording portion is in proper contact with the head. With a higher density magnetic tape, the required velocity of a transported card is slower. In the preferred embodiment this is achieved by means of the drive roller of a small diameter 15; the metal shaft of a flywheel itself can be utilized as the driving roller; a pulley of a certain diameter is fixed concentrically on the shaft of a commercially available d.c. motor 23 and coupled by a rubber belt 22 with the engraved rim of the flywheel 21. When the diameter of the driving roller 15 is small, it is found difficult to frictionally drive a card steadily, especially a stiff card, as the contact between the driving roller and the card surface is only through a point; while the flexible card is transported by the card feeder, the flexible card is locally bent over the surface of the drive roller sufficiently to increase an arc of frictional engagement.

The flexible card of a given material can be bent into a cylindrical surface characterized by the minimum diameter of contacting circle (at least momentarily) without material structure being destroyed and, moreover, restoring its original flatness readily after being fed through the card feeder; the minimum diameter depends on material as well as thickness of the card. Such a bending is called overall bending. The flexible cards are especially characterized by the local bending capability described hereafter rather than by mere overall bending. The permissible upper value of said minimum diameter including cards made of several different kinds of materials and thicknesses is limited by physical configuration of the drive roller (together with the rubber roller as cushion) in relation to other parts of the card feeder; even when the configuration is given (without guides) a path for a card-sheet of one material is not necessarily the same as that of other materials and thicknesses. If the card were like a fabric material hardly any deviation from straight path is realized excepting around the drive roller; some plastic sheets can be driven through as the minimum diameter is small although self-restoring feature is not met. Therefore, the material as well as structure (manufacture) of the flexible cards are of such a property and nature that as a result of local bending (elastic and plastic) deformations are not realizable significantly at other areas on the flexible card when the card is instantaneously held at least at two places and stretched. The local bending quoted here is dynamic one, as though a cylindrical wave deformation passing through the entire area of the card; for that the arc of frictional engagement rather than the curvature of bending itself is small compared with the longitudinal length of the card. The flexible cards also possesses the physical capabilities similar to that of a sheet of deflecting metal spring, and apparently its self-restoring and self-sustaining feature is implied. Any bending over the transducer head is considered to be nothing like the local bending mentioned above and easily regarded as usual bending of static nature. Furthermore, said flexible card is made to sustain compression due to instantaneous clamping by the drive rollers so that uniformity of the surface frictional property is preserved after repeated use; that many of finer paper sheets including that of plastic materials can be driven frictionally, being bent around said drive roller, is not only compatible with the above use properties of the flexible card but, in turn, indicative of a lower permissible value of the surface friction.

The two pairs of rollers 12, 13, 14 and 15 are used to hold a moving card at least at two places when sound recorded portions 18 of the card 11 make sliding contact with the head. However, a card is not like a continuous belt. Unless a card is made longer than longitudinal length of recorded area so that a margin of non-recorded area is left at the tail the card is not held by the pair of guide rollers at the end of transportation, and a poorer reproducing of pronunciation can result due to inadequate contact between the card and the head 10.

If a card is of such a quality that it will easily come within the class of the flexible cards, the auxiliary roller is not required to be mounted; the flexible card clamped by the pair of drive roller has a tendency of deflecting back to the tangential direction common to the surfaces of the drive rollers; such a deflection is intercepted by the transducer head; and the flexible card is bent oppositely so as to cover the curved surface of the head by means of the guide roller mounted perpendicularly on the board and placed on the entrance side; the net result is that the card tail deflects to the guide roller, and the cylindrical surface portion of the guide roller is in contact with the deflecting card without having the auxiliary roller when the lever is shifted to clamping position.

Guide means for the flexible cards includes a combination of the guide roller and a pair of parallel guides which are made to fit along the locally curved natural path of the flexible card. Another combination for the guide means is the flat tube and the parallel guides. However, the flat tube, openably formed and disposed at the entrance side in relation to the guide roller, is usable in combination with the pair of guide rollers if the card or sheet is long and floppy; also the flat tube and the guide rollers both disposed as in the combination are usable with the pair of parallel guides mounted between the guide roller and the drive pair of rollers.

Referring to FIG. 2, the pair of parallel guides 17 along each of which a longitudinal edge of a moving card 11 may slide are mounted at a position between the pair of guide rollers 12 and 13 and the pair of drive rollers 14 and 15, wherein the paths of flexible cards made of different kinds of materials and thickness relatively converge into a collectively definable path represented by a straight line. After the card is no longer clamped by the pair of guide roller, then it is held at the edges by the pair of parallel guides; though the head 10 and pressure pad 26 on a spring are holding the card at a small area, the card still has a tendency of deflecting back to the tangential direction common to the surfaces of the pair of drive rollers without having the guide-grooves 17; such a tendency of deflection exerts a pressure on the inner surface of the guides giving rise to said instantaneous holding due to friction between the card and the inner surface of the guides.

It is found that a pressure pad mounted against the head surface would not provide a perfect sound reproduction as it would with the guide means achieved by smoothly bending the card over the front surface of the transducer head; neither the guide roller nor the drive roller are mounted to engage with the head, leaving the head untouched except by the sound recording portions of the card.

Each of the two parallel guide-grooves 17 which can be asymetric is supported by each of a pair of planar boards comprising the planar board 25 and another planar board 27 mounted parallel to the board 25 with a separation distance sufficient to accommodate the flexible card in widthwise direction; the parallel guides thereby also serve to confine movement of a transported card from a lateral motion.

When the recording portion of the flexible card is mounted on an edge of the card, one of the pair of parallel guides 17 corresponding to the edge is divided into two sections so as to have the transducer head disposed onto the edge, making the pair of guides asymetric; the lever 24 mounted on a lever shaft 28 is made movable not only around the shaft 28 but also laterally along the lever shaft 28.

Furthermore, the distance between the pair of drive rollers and the pair of guide rollers is made short to make the margins narrow. Once the distance is made short in comparison to length of a card, it is preferred to have the another section of parallel guides mounted on the entrance side in relation to the guide roller in order to prevent tilting of the card due to deflection. Another arrangement is to mount a flat tube 16 at the position of the entrance as shown in FIG. 1; the guide means comprises only the flat tube 16 without the followings: the pair of guide rollers, pair of parallel guides on the entrance side, and pair of parallel guides between the drive pair of rollers and the flat tube 16. The cross-section of the flat tube is of the shape of a narrow slit and the length of the slit is made equal to the width of cards. The length of each rollers can be made to match the length of lateral sides.

The use of flexible card and positional relationship of the drive rollers, the head and the guide means constitutes an important feature of the invention which substantially simplify the device at the same time improve the quality of sound reproduction and moreover stringently limit the choice of card quality.

As an integrated part of the sound reproducing device the alternative structures of the flexible cards or sheets are listed.

Example (a). A method of preparing said flexible cards is: after magnetically susceptible materials being coated uniformly on a large sheet (or roll) of substrate, a wider magnetic tape (than standard width), which can be as wide as the width of the flexible card-sheet, is obtained by slicing the coated large sheet; then the wide magnetic tape is cut into the required minimum length depending on the density and type of corresponding magnetic tape and having recorded thereon the standard pronunciation on a portion of the regular width; the rest of the area of the wide magnetic tape is utilized to print the spelling or characters of the word; a flexible card-sheet is overlaid with or without a binder from the (back) surface not coated with magnetically susceptible material; the edges of the wide magnetic tape of card size are secured on the flexible card-sheet by means of an adhesive tape thereby forming said flexible card for easier handling; the flexible card-sheet can be either transparent or opaque.

Example (b). Another method of preparing the flexible cards is by cutting through a portion of flexible card-sheet in a shape of rectangular opening so as to accommodate a magnetic tape (sheet) of the required minimum length and of the width wider than that of the transducer head, and by laminating with a thin adhesive tape available in market from the surface on which no magnetically susceptible material is coated; the wide magnetic tape specified here and also in (a) are examples of magnetic tape sheet as so termed.

Example (c). Further another method of preparing the flexible cards is by having a strip of magnetic tape of the required minimum length placed next to a linear edge of the flexible card-sheet without any overlapping and by laminating with a thin adhesive tape from the surface on which no magnetically susceptible material is coated. Letters or characters can be written anywhere on both sides of the surfaces of a flexible card but usually excluding the sound recorded surface areas. It is found that covering the sound recorded surface areas with a thin cover strip causes hindering when a commercially available said electromagnetic transducer head is used.

When the magnetic coating on a transparent substrate is at least semi-transparent, the other (back) surface of magnetic tape oppositely distinct from the surface coated with magnetically susceptible materials is available for writing letters or characters.

In brief, to operate the device shown in FIG. (1) place a card through the gap between the pair of drive roller when the pair is in open position and put the tail side of the card through the openably formed flat tube; (2) clamp the card with the drive pair; (3) turn on switches for the electronic circuits of the device and the motor. To operate the device shown in FIG. 2, (1) place a card through the gaps between both pairs of rollers and through the parallel guides; (2) clamp the card with the drive pair by shifting the lever to a clamping position; (3) turn on switches for the circuits of the device and the motor. The second and the third steps are reversible in both cases. A switch can be connected so that the device stops each time automatically as soon as the pronunciation of each word is reproduced.

What is claimed is:

1. A sound reproducing device for use in combination with a flexible card comprising a wide magnetic tape of card size and a flexible sheet of card materials, having laminated over the back surface of said wide magnetic tape not coated with magnetically susceptible materials, thereby secured together at least at the edges of said card by means of adhesive tapes, and having printed thereon the spelling or characters of the word recorded on said magnetic tape, the flexible card being locally bent during the processes of sound reproduction, said device comprising:

a. a planar board;
b. a shiftable lever movable in an imaginary plane parallel to said board, so as to clamp or release said card, and laterally movable in order to place said lever on the recording portions located at a lateral coordinate on said flexible card;

c. an electromagnetic transducer head mounted on said lever such that the tangential plane imagined at the center of the curved front surface of said head is perpendicular with respect to said board;

d. a rubber roller rotatably mounted on said lever in the direction perpendicular to said board and disposed on the exit side in relation to said head;

e. a drive roller rotatably mounted on said board perpendicularly and disposed in such a manner that said flexible card is locally bent over the surface of said drive roller to increase an arc of frictional engagement and to propel said flexible card when said drive roller is connected to a power transmitting means, and said flexible card is clamped instantaneously between said drive roller and said rubber roller, composing the pair of drive rollers located at the exit for a card;

f. a pair of planar boards comprising said board and another planar board mounted parallel to said board with a separation distance sufficient to accommodate said card widthwise so as to let each of the longitudinal boundaries of said card slide along each surface of said boards while said flexible card is perpendicularly situated with respect to said boards and transported;

g. guide means for having said flexible card put at proper place and locally bent over the curved front surface of said head which is disposed slightly crossing the imaginary plane drawn asymptotically on the entrance side of said guide means in such a manner to include the contact line of said pair of drive rollers, when said lever is in clamping position and said card is transported;

h. a card feeder comprising said pair of drive rollers, said power transmitting means and said guide means, said card feeder operative to bring the sound recorded portion of said flexible card tangentially to and in sliding contact with the central area of said head, said power transmitting means comprising a d.c. motor, a pulley fixed coaxially on the shaft of said motor, a flywheel, a rubber belt, and a metal shaft fixed at one end to the center of said flywheel and utilized as the body of said drive roller, said flywheel being engraved on the rim whereby coupled with said pulley by said rubber belt to transmit rotational motion to said drive roller;

i. a power supply, a speaker, a microphone and electronic circuitries necessary in position and connected to said transducer head in order to have pronunciations recorded on and to reproduce from the recorded portion of said flexible card.

2. The combination of claim 1 wherein said guide means includes:

a. a guide roller mounted perpendicularly on said planar board and placed at a position on the entrance side such that said flexible card, clamped by said drive pair and slightly bent over said drive roller, is bent oppositely whereby wrapping the curved front surface of said transducer head which is disposed slightly crossing the imaginary plane tangentially drawn from the contact line of said pair of drive rollers onto the cylindrical surface portion of said guide roller facing said transducer;

b. an auxiliary roller mounted on said lever in the direction perpendicular to said board, composing the pair of guide rollers located at the entrance for a card; and c. a pair of parallel guides mounted longitudinally on said pair of boards and located between the drive pair and said guide roller so as to let both edges of said card slide along the inner surfaces of said guides.

3. The combination of claim 1 wherein said guide means includes:

a. a flat tube openably formed and located on the entrance side in relation to said transducer head so as to have said card initially guided through the channel of said tube; and b. a pair of guides mounted longitudinally on said pair of boards and located between the drive pair and said guide roller so as to let both edges of said card slide along the inner surfaces of said guides.

4. A sound reproducing device for use in combination with a flexible card comprising a flexible sheet of card materials and a segment of a wide sound recording magnetic tape, having placed adjacent to a linear boundary of said flexible sheet without overlapping, laminated with adhesive tapes over the back surface not coated with magnetically susceptible materials so as to mount said tape on the boundary of said card, and having printed on the remaining portion the spelling or characters of the word recorded on said magnetic tape, said flexible card being locally bent during the processes of sound reproduction, said device comprising:

a. a planar board;

b. a shiftable lever movable in an imaginary plane parallel to said board, so as to clamp or release said card, and laterally movable in order to place said lever on the recording portions located at a lateral coordinate on said flexible card;

c. an electromagnetic transducer head mounted on said lever such that the tangential plane imagined at the center of the curved front surface of said head is perpendicular with respect to said board;

d. a rubber roller rotatably mounted on said lever in the direction perpendicular to said board and disposed on the exit side in relation to said head;

e. a drive roller rotatably mounted on said board perpendicularly and disposed in such a manner that said flexible card is locally bent over the surface of said drive roller to increase an arc of frictional engagement and to propel said flexible card when said drive roller is connected to a power transmitting means, and said flexible card is clamped instantaneously between said drive roller and said rubber roller, composing the pair of drive rollers located at the exit for a card;

f. a pair of planar boards comprising said board and another planar board mounted parallel to said board with a separation distance sufficient to accommodate said card widthwise so as to let each of the longitudinal boundaries of said card slide along each surface of said boards while said flexible card is perpendicularly situated with respect to said boards and transported;

g. guide means for having said flexible card put at proper place and locally bent over the curved front surface of said head which is disposed slightly crossing the imaginary plane drawn asymptotically on the entrance side of said guide means in such a manner to include the contact line of said pair of drive rollers, when said lever is in clamping position and said card is transported;

h. a card feeder comprising said pair of drive rollers, said power transmitting means and said guide means, said card feeder operative to bring the sound recorded portion of said flexible card tangentially to and in sliding contact with the central area of said head, said power transmitting means comprising a d.c. motor, a pulley fixed coaxially on the shaft of said motor, a flywheel, a rubber belt, and a metal shaft fixed at one end to the center of said flywheel and utilized as the body of said drive roller, said flywheel being engraved on the rim whereby coupled with said pulley by said rubber belt to transmit rotational motion to said drive roller;

i. a power supply, a speaker, a microphone and electronic circuitries necessary in position and connected to said transducer head in order to have pronunciations recorded on and to reproduce from the recorded portion of said flexible card.

5. The combination of claim 4 wherein said guide means includes:

a. a guide roller mounted perpendicularly on said planar board and placed at a position on the entrance side such that said flexible card, clamped by said drive pair and slightly bent over said drive roller, is bent oppositely whereby wrapping the curved front surface of said transducer head which is disposed slightly crossing the imaginary plane tangentially drawn from the contact line of said pair of drive rollers onto the cylindrical surface portion of said guide roller facing said transdcuer;

b. an auxiliary roller mounted on said lever in the direction perpendicular to said board, composing the pair of guide rollers located at the entrance for a card; and c. a pair of parallel guides mounted longitudinally on the pair of boards and located between the drive pair and said guide roller so as to let both edges of said card slide along the inner surfaces of said guides.

6. The combination of claim 4 wherein said guide means includes:

a. a flat tube openably formed and located on the entrance side in relation to said transducer head so as to have said card initially guided through the channel of said tube; and b. a pair of guides mounted longitudinally on said pair of boards and located between the drive pair and said guide roller so as to let both edges of said card slide along the inner surfaces of said guides.

7. A sound reproducing device for use in combination with a flexible card comprising at least a segment of a wide sound recording magnetic tape and a flexible sheet of card materials, having a portion cut out entirely and a segment of said tape placed within, laminated with adhesive tapes over the back surface not coated with magnetically susceptible materials so as to mount said magnetic tape parallel to a linear boundary of said card, and having printed on the remaining portion the spelling or characters of the word recorded on said magnetic tape, said flexible card being locally bent during the processes of sound reproduction, said device comprising:

a. a planar board;

b. a shiftable lever movable in an imaginary plane parallel to said board, so as to clamp or release said card, and laterally movable in order to place said lever on the recording portions located at a lateral coordinate on said flexible card;

c. an electromagnetic transducer head mounted on said lever such that the tangential plane imagined at the center of the curved front surface of said head is perpendicular with respect to said board;

d. a rubber roller rotatably mounted on said lever in the direction perpendicular to said board and disposed on the exit side in relation to said head;

e. a drive roller rotatably mounted on said board perpendicularly and disposed in such a manner that said flexible card is locally bent over the surface of said drive roller to increase an arc of frictional engagement and to propel said flexible card when said drive roller is connected to a power transmitting means, and said flexible card is clamped instantaneously between said drive roller and said rubber roller, composing the pair of drive rollers located at the exit for a card;

f. a pair of planar boards comprising said board and another planar board mounted parallel to said board with a separation distance sufficient to accommodate said card widthwise so as to let each of the longitudinal boundaries of said card slide along each surface of said boards while said flexible card is perpendicularly situated with respect to said boards and transported;

g. guide means for having said flexible card put at proper place and locally bent over the curved front surface of said head which is disposed slightly crossing the imaginary plane drawn asymptotically on the entrance side of said guide means in such a manner to include the contact line of said pair of drive rollers, when said lever is in clamping position and said card is transported;

h. a card feeder comprising said pair of drive rollers, said power transmitting means and said guide means, said card feeder operative to bring the sound recorded portion of said flexible card tangentially to and in sliding contact with the central area of said head, said power transmitting means comprising a d.c. motor, a pulley fixed coaxially on the shaft of said motor, a flywheel, a rubber belt, and a metal shaft fixed at one end to the center of said flywheel and utilized as the body of said drive roller, said flywheel being engraved on the rim whereby coupled with said pulley by said rubber belt to transmit rotational motion to said drive roller;

i. a power supply, a speaker, a microphone and electronic circuitries necessary in position and connected to said transducer head in order to have pronunciations recorded on and to reproduce from the recorded portion of said flexible card.

8. The combination of claim 7 wherein said guide means includes:

a. a guide roller mounted perpendicularly on said planar board and placed at a position on the entrance side such that said flexible card, clamped by said drive pair and slightly bent over said drive roller, is bent oppositely whereby wrapping the curved front surface of said transducer head which is disposed slightly crossing the imaginary plane tangentially drawn from the contact line of said pair of drive rollers onto the cylindrical surface portion of said guide roller facing said transducer;

b. an auxiliary roller mounted on said lever in the direction perpendicular to said board, composing the pair of guide rollers located at the entrance for a card; and c. a pair of parallel guides mounted longitudinally on the pair of boards and located between the drive pair and said guide roller so as to let both edges of said card slide along the inner surfaces of said guides.

9. The combination of claim 7 wherein said guide means includes:

a. a flat tube openably formed and located on the entrance side in relation to said transducer head so as to have said card initially guided through the channel of said tube; and b. a pair of guides mounted longitudinally on said pair of boards and located between the drive pair and said guide roller so as to let both edges of said card slide along the inner surfaces of said guides.

* * * * *